United States Patent
Sankoda

(10) Patent No.: US 11,798,558 B2
(45) Date of Patent: Oct. 24, 2023

(54) RECORDING MEDIUM RECORDING PROGRAM, INFORMATION PROCESSING APPARATUS, AND INFORMATION PROCESSING METHOD FOR TRANSCRIPTION

(71) Applicant: FUJITSU LIMITED, Kawasaki (JP)

(72) Inventor: Satoru Sankoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 453 days.

(21) Appl. No.: 16/914,621

(22) Filed: Jun. 29, 2020

(65) Prior Publication Data

US 2021/0005204 A1 Jan. 7, 2021

(30) Foreign Application Priority Data

Jul. 2, 2019 (JP) .................................. 2019-123939

(51) Int. Cl.
*G10L 15/26* (2006.01)
*G10L 15/02* (2006.01)
(Continued)

(52) U.S. Cl.
CPC ............ *G10L 15/26* (2013.01); *G06F 40/166* (2020.01); *G06F 40/40* (2020.01); *G10L 15/02* (2013.01);
(Continued)

(58) Field of Classification Search
CPC ......... G10L 15/22; G10L 15/26; G10L 15/20; G10L 15/01
See application file for complete search history.

(56) References Cited

U.S. PATENT DOCUMENTS 6,269,335 B1 * 7/2001 Ittycheriah .............. G10L 15/22
704/E15.04
10,529,316 B1 * 1/2020 Cherepanov ............ G10L 15/26
(Continued)

FOREIGN PATENT DOCUMENTS

JP 2001-92493 A 4/2001
JP 2002-156996 A 5/2002
(Continued)

OTHER PUBLICATIONS

K.Ota et al., "A note-taking system using respeaking errors in automatic speech recognition of lectures", the 77th National Convention of Information Processing Society of Japan, pp. 2-125-2-126, Mar. 17, 2015. Cited in JP-OA mailed on Jan. 24, 2023 for corresponding Japanese Patent Application No. 2019-123939.
(Continued)

*Primary Examiner* — Samuel G Neway
(74) *Attorney, Agent, or Firm* — Fujitsu Patent Center

(57) ABSTRACT

A method for transcription is performed by a computer. The method includes: accepting input of a voice after causing a display unit to display a sentence including a plurality of words; acquiring first sound information being information concerning sounds corresponding to the sentence; acquiring second sound information being information concerning sounds of the voice accepted in the accepting; specifying a portion in the first sound information having a prescribed similarity to the second sound information; and correcting a character string in the sentence corresponding to the specified portion based on a character string corresponding to the second sound information.

17 Claims, 13 Drawing Sheets

(51) Int. Cl.
    *G10L 25/51*     (2013.01)
    *G06F 40/166*     (2020.01)
    *G06F 40/40*     (2020.01)
    *G10L 25/78*     (2013.01)
    *G10L 15/22*     (2006.01)

(52) U.S. Cl.
    CPC .............. *G10L 15/22* (2013.01); *G10L 25/51* (2013.01); *G10L 25/78* (2013.01); *G10L 2015/025* (2013.01); *G10L 2025/783* (2013.01)

(56) References Cited

U.S. PATENT DOCUMENTS

| | | | | |
|---|---|---|---|---|
| 2006/0167684 | A1* | 7/2006 | Tsai | G06F 16/68 704/E15.04 |
| 2008/0243514 | A1* | 10/2008 | Gopinath | G10L 15/22 704/E15.04 |
| 2012/0304057 | A1* | 11/2012 | Labsky | G10L 13/00 715/256 |
| 2014/0303975 | A1* | 10/2014 | Ohmura | G10L 15/22 704/235 |
| 2014/0337370 | A1* | 11/2014 | Aravamudan | G06F 16/245 707/759 |
| 2017/0270086 | A1 | 9/2017 | Fume et al. | |
| 2018/0197528 | A1* | 7/2018 | Pike | G10L 13/08 |
| 2020/0082808 | A1* | 3/2020 | Li | G10L 15/08 |
| 2020/0160866 | A1* | 5/2020 | Szymanski | G06N 3/08 |
| 2021/0005204 | A1* | 1/2021 | Sankoda | G10L 15/02 |

FOREIGN PATENT DOCUMENTS

| | | |
|---|---|---|
| JP | 2015-184564 | 10/2015 |
| JP | 2017-167368 | 9/2017 |

OTHER PUBLICATIONS

JPOA—Office Action of Japanese Patent Application No. 2019-123939 dated Jan. 24, 2023 with Full Machine Translation.

\* cited by examiner

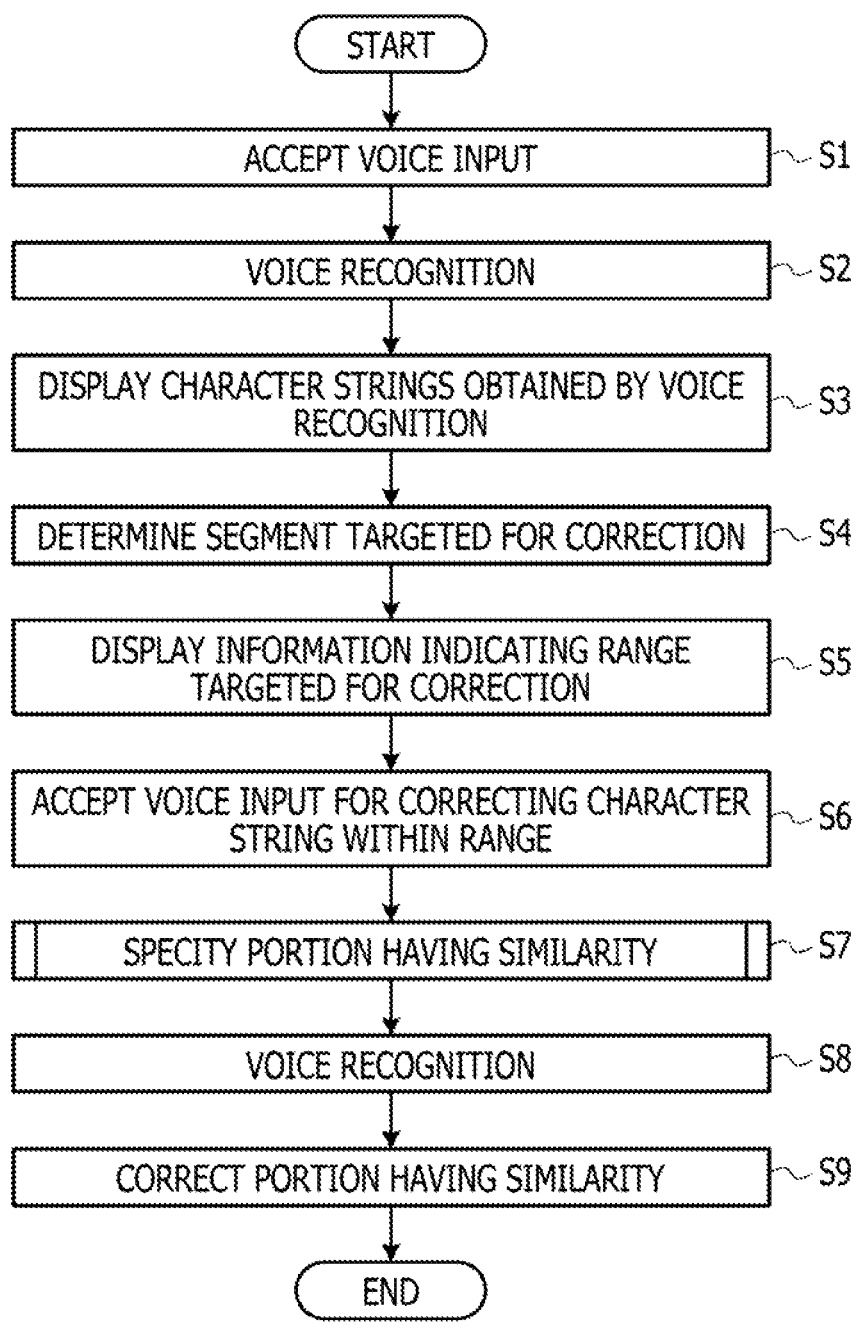

FIG. 9

| FALSE PHONEME SEQUENCE | CORRECT PHONEME SEQUENCE | FAULT COUNT |
|---|---|---|
| kyua | kiwa | 220 |
| kyua | kia | 153 |
| kyua | kua | 5 |
| ... | ... | ... |
| de | re | 163 |
| ... | ... | ... |

FIG. 10

| FAULT CONTENT | CORRECTED CONTENT | FAULT COUNT |
|---|---|---|
| セキュアで | 積和で | 220 |
| セキュアで | 数寄屋で | 153 |
| セキュアで | 好きやで | 112 |
| セキュアで | 席割れ | 108 |
| セキュアで | 赤裸々で | 12 |
| ... | ... | ... |

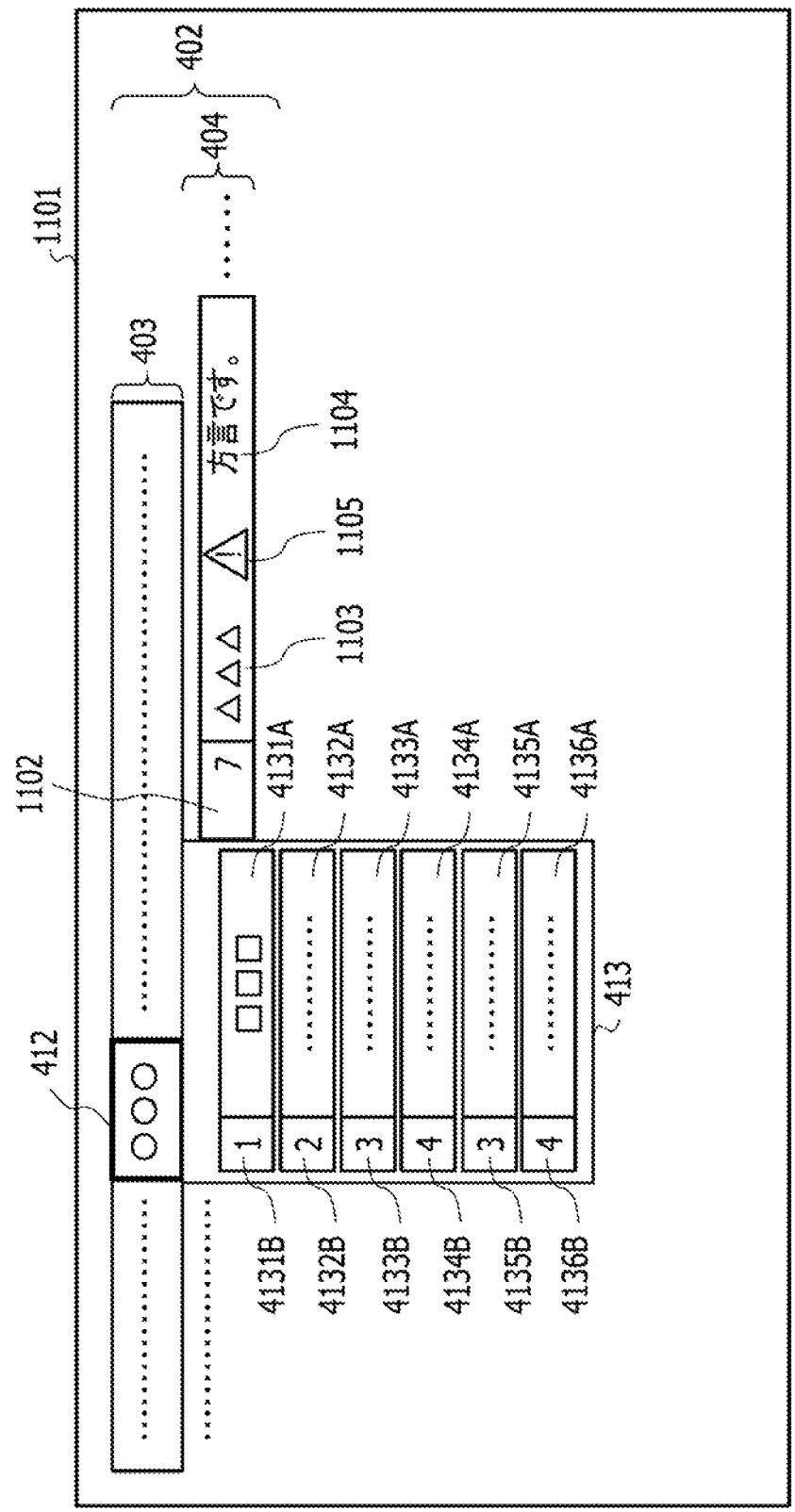

RECORDING MEDIUM RECORDING PROGRAM, INFORMATION PROCESSING APPARATUS, AND INFORMATION PROCESSING METHOD FOR TRANSCRIPTION

CROSS-REFERENCE TO RELATED APPLICATION

This application is based upon and claims the benefit of priority of the prior Japanese Patent Application No. 2019-123939, filed on Jul. 2, 2019, the entire contents of which are incorporated herein by reference.

FIELD

An embodiment discussed herein is related to a computer-readable recording medium recording a program, an information processing apparatus, and an information processing method for transcription.

BACKGROUND

An input device such as a keyboard has heretofore been used for inputting character strings of sentences and the like. There has also been known a voice recognition technique that enables input of character strings such as sentences by using voices (see Japanese Laid-open Patent Publication No. 2001-092493, for example). For example, the voice recognition has been used for producing closed captions in television broadcast programs, recording contents of phone calls at a call center, making transcriptions of an interview of a meeting, and so forth. These are referred to, herein below, as "transcription" in a broad sense.

SUMMARY

According to an aspect of the embodiments, a method for transcription is performed by a computer. The method includes: accepting input of a voice after causing a display unit to display a sentence including a plurality of words; acquiring first sound information being information concerning sounds corresponding to the sentence; acquiring second sound information being information concerning sounds of the voice accepted in the accepting; specifying a portion in the first sound information having a prescribed similarity to the second sound information; and correcting a character string in the sentence corresponding to the specified portion based on a character string corresponding to the second sound information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a flowchart illustrating an example of processing executed in the information processing apparatus according to the embodiment;

FIG. 9 is a diagram illustrating an example of a history of falsely recognized phoneme sequences stored in a falsely recognized phoneme sequence statistical DB according to the embodiment;

FIG. 10 is a diagram illustrating an example of a history of falsely recognized character strings stored in a falsely recognized character string statistical DB according to the embodiment; and FIG. 11 is a diagram explaining an example of the display screen according to the embodiment.

DESCRIPTION OF EMBODIMENTS

In the conventional art, inputting character strings with the input device like the keyboard may cause faults such as typographical errors due to false operations, false conversion, and so forth. Inputting character strings by using the voice recognition may cause faults such as typographical errors due to fluffs, false recognition in the course of the voice recognition, and so forth.

When a fault in a sentence containing multiple words (phrases) is corrected according to the related art, a user is supposed to correct a false section while designating the false section through manipulation of a mouse, a keyboard, and the like.

An embodiment of the present disclosure will be described below with reference to drawings.

<Hardware Configuration>

Figure 1:
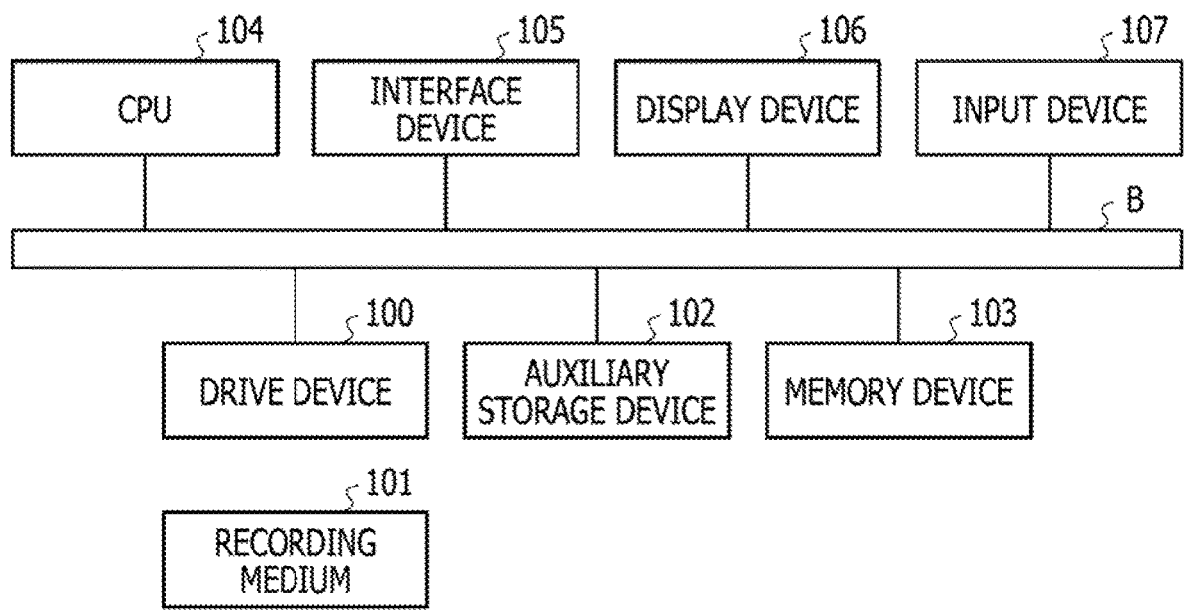
FIG. 1 is a diagram illustrating an example of a hardware configuration of an information processing apparatus according to an embodiment.

FIG. 1 is a diagram illustrating an example of a hardware configuration of an information processing apparatus 10 according to an embodiment. The information processing apparatus 10 in FIG. 1 includes a drive device 100, an auxiliary storage device 102, a memory device 103, a central processing unit (CPU) 104, an interface device 105, a display device 106, an input device 107, and the like that are coupled to one another through a bus B. The display device 106 represents an example of a "display unit".

A program that realizes processing in the information processing apparatus 10 is provided by a recording medium 101. When the recording medium 101 that records the program is set in the drive device 100, the program is installed from the recording medium 101 to the auxiliary storage device 102 via the drive device 100. However, the program does not have to be installed from the recording medium 101 and may be downloaded from another computer via a network. The auxiliary storage device 102 stores the installed program, and also stores requested files, data, and the like.

The memory device 103 reads the program from the auxiliary storage device 102 and stores the program in response to an instruction to start the program. The CPU 104 realizes functions related to the information processing apparatus 10 in accordance with the program stored in the memory device 103. The interface device 105 is used as an interface for establishing coupling to the network. The display device 106 is a display unit that displays a graphical user interface (GUI) or the like based on the program. The input device 107 receives input of various operating instructions. The input device 107 may include a microphone that collects voices, and a keyboard that accepts input of characters and the like from a user by pressing keys, for example.

Examples of the recording medium 101 include portable recording media such as a compact disc read-only memory (CD-ROM), a digital versatile disc (DVD), and a Universal Serial Bus (USB) memory. Examples of the auxiliary storage device 102 include a hard disk drive (HDD), a flash memory, and the like. Each of the recording medium 101 and the auxiliary storage device 102 corresponds to a computer-readable recording medium.

<Functional Configuration>

Figure 2:
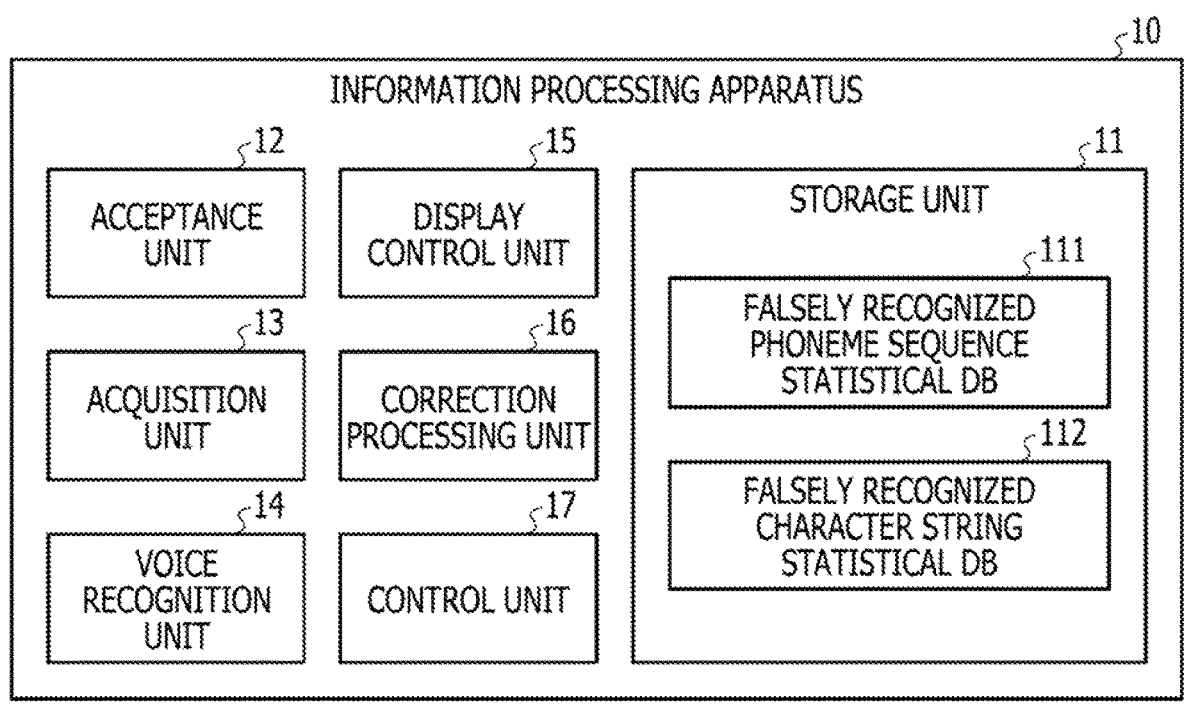
FIG. 2 is a diagram illustrating an example of a functional configuration of the information processing apparatus according to the embodiment.

Next, a functional configuration of the information processing apparatus 10 according to the embodiment will be described with reference to FIG. 2. FIG. 2 is a diagram illustrating an example of the functional configuration of the information processing apparatus 10 according to the embodiment.

The information processing apparatus 10 includes a storage unit 11. The storage unit 11 includes a falsely recognized phoneme sequence statistical database (DB) 111 that stores a history of falsely recognized phoneme sequences, and a falsely recognized character string statistical DB 112 that stores a history of falsely recognized character strings, and the like. For example, the storage unit 11 may be realized by using the auxiliary storage device 102 and the like.

The information processing apparatus 10 also includes an acceptance unit 12, an acquisition unit 13, a voice recognition unit 14, a display control unit 15, a correction processing unit 16, and a control unit 17. These units may be realized by processing that one or more programs installed in the information processing apparatus 10 cause the CPU 104 of the information processing apparatus 10 to execute.

The acceptance unit 12 accepts input of a variety of information from a user. The acceptance unit 12 accepts input of a voice for correcting a displayed sentence, for example.

The acquisition unit 13 acquires (recognizes) the inputted voice accepted by the acceptance unit 12 and information on phonemes corresponding to character strings.

The voice recognition unit 14 performs voice recognition of the inputted voice accepted by the acceptance unit 12 in accordance with instructions of the correction processing unit 16, the control unit 17, and the like, thereby converting the voice into character strings.

The display control unit 15 displays a variety of information on a screen in accordance with instructions of the correction processing unit 16 and the control unit 17.

The correction processing unit 16 corrects at least part of a sentence displayed by the display control unit 15 based on the inputted voice accepted by the acceptance unit 12. The control unit 17 controls the entire character input processing by means of the voice input and the like.

<Processing>

Next, an example of processing executed in the information processing apparatus 10 according to the embodiment will be described with reference to FIGS. 3 to 4C. FIG. 3 is a flowchart illustrating an example of the processing executed in the information processing apparatus 10 according to the embodiment. FIGS. 4A to 4C are diagrams explaining examples of the display screen according to the embodiment. The following processing may be executed every time one or more sentences are spoken, for example.

In step S1, the acceptance unit 12 accepts the input of the voice. The acceptance unit 12 may accept input of a voice spoken by an announcer or the like in a television broadcast program, for example. The acceptance unit 12 may also accept input of a voice restated as a summary of the content of the voice in the television broadcast program. Alternatively, the acceptance unit 12 may accept input of a voice in a meeting, for example.

Next, the voice recognition unit 14 subjects the inputted voice to voice recognition, thereby converting the inputted voice into character strings of a sentence containing multiple words (step S2). Subsequently, the control unit 17 displays the character strings obtained by the voice recognition on a screen (step S3). The control unit 17 may display character strings of a sentence or the like that is inputted by using the input device such as the keyboard instead of the character strings obtained by the voice recognition.

Next, the correction processing unit 16 determines a segment (a range) targeted for correction out of the character strings in the displayed sentence (step S4). The correction processing unit 16 divides a certain sentence obtained by the voice recognition into multiple segments, for example.

For instance, the correction processing unit 16 may determine the segment targeted for correction out of the certain sentence obtained by the voice recognition based on the number of characters. In this case, the correction processing unit 16 may allocate a predetermined number of characters counted from the character at the head of the certain sentence obtained by the voice recognition to a head segment, and allocate the character strings starting from the next character to a subsequent segment, for example.

The correction processing unit 16 may determine the segment targeted for correction out of the certain sentence obtained by the voice recognition based on a time length, for example. In this case, the correction processing unit 16 may allocate the character strings that are spoken from a time point when the voice is initially spoken to a time point after a passage of a predetermined period (such as 4 seconds) and obtained by the voice recognition to the head segment, and allocate the character strings spoken thereafter and obtained by the voice recognition to the subsequent segment, for example.

The correction processing unit 16 may perform a morphological analysis of the certain sentence obtained by the voice recognition. When a breakpoint of segments determined depending on the number of characters, the time length, or the like is located in the middle of a character string that represents a word, the correction processing unit 16 may allocate the entire character string of the relevant word to any of the head segment or the subsequent segment. This makes it possible to reduce the chance of a failure to correct the relevant word when the word straddles the multiple segments.

The correction processing unit 16 may determine the segment targeted for correction out of the certain sentence obtained by the voice recognition based on a speaker, for example. In this case, the correction processing unit 16 may identify the speakers during each session of the voice recognition. When a speech of a first speaker is taken over by a speech of a second speaker, the correction processing unit 16 may allocate the character strings spoken by the first speaker and obtained by the voice recognition to the head segment and allocate the character strings spoken by the second speaker and obtained by the voice recognition to the subsequent segment.

The correction processing unit 16 may determine the segment targeted for correction out of the certain sentence obtained by the voice recognition based on a mute segment during the speech (which represents an example of a "breakpoint of a voice"), for example. In this case, when there is a mute segment for a predetermined period (such as 1 second) or more during the speech, for example, the correction processing unit 16 may allocate the character strings that are spoken before the mute segment and obtained by the voice recognition to the head segment and allocate the character strings spoken after the mute segment and obtained by the voice recognition to the subsequent segment.

The correction processing unit 16 may determine the segment targeted for correction out of the certain sentence obtained by the voice recognition based on the number of words, for example. In this case, the correction processing unit 16 may perform a morphological analysis of the certain sentence obtained by the voice recognition and divide the certain sentence into respective words. Then, a predetermined number of words counted from the head of the certain sentence may be allocated to the head segment and the subsequent words may be allocated to the subsequent segment.

Next, the correction processing unit 16 displays information indicating the range targeted for correction out of the character strings in the displayed sentence (step S5). In an example of a display screen 401 in FIG. 4A, a sentence 402 displayed as a result of the processing in step S3 includes character strings 403 "データに対し関谷で高速な処理を実現できるか," corresponding to an inputted voice "deetanitaisisekiyadekousokunasyoriwojkugendekiruka" (meaning "can we realize a sekiya and high-speed process of data?") and character strings 404 "会社が変わったときに本当にうまくワークするのかも検収します" corresponding to an inputted voice "kaisyagakawattatokinihontouniumakuwaakusurunokamokensyuusimasu" (meaning "I will inspect and confirm if it really works for another company"). In the example of the display screen 401 in FIG. 4A, the correction processing unit 16 displays a frame 405 that surrounds the character strings 403 representing the range targeted for correction. This enables the user to figure out the range targeted for visual check on false conversion, false recognition, typographical errors, omitted letters, and the like.

Next, the acceptance unit 12 accepts input of a voice for correcting the character strings in the range targeted for correction (step S6). Subsequently, the correction processing unit 16 specifies a portion in first sound information being information concerning sounds corresponding to the character strings displayed in the processing in step S3, which is the portion having a prescribed similarity to second sound information being information concerning the voice inputted in the processing in step S6 (step S7). This processing will be described later.

Next, the voice recognition unit 14 subjects the inputted voice to voice recognition, thereby converting the inputted voice into character strings (step S8). This processing will be described later. The voice recognition unit 14 may infer character strings corresponding to the inputted voice by using machine learning such as deep learning, thereby determining a predetermined number of (such as 1 or more) character strings as correction candidates in descending order of inference certainty. In this embodiment, the determination of the predetermined number of character strings as the correction candidates represents an example of processing to correct a sentence based on character strings corresponding to an inputted voice.

Next, the correction processing unit 16 corrects the specified portion based on the character strings converted in the processing in step S8 (step S9). In an example of a display screen 411 in FIG. 41, the correction processing unit 16 causes the screen to display a frame 412 indicating that a character string "関谷で" (reading "sekiyade", meaning "by Sekiya") included in character strings 403 is selected as the specified portion (a replacement target). This is because "関谷" is usually a name of person or a place, and does not make any sense in the context of the character string 403. The correction processing unit 16 also displays codes 4131B to 41368 representing the order of priority of respective correction candidates in a region 413 while associating the codes with character strings 4131A to 4136A of the respective correction candidates.

The correction processing unit 16 then replaces the character string of the specified portion with a character string of the correction candidate selected by the user from the respective correction candidates. In an example of a display screen 421 in FIG. 4C, the character string "関谷で" surrounded by the frame 412 is replaced with the character string 4131A "セキュアで" (reading "sekyua-de", meaning "secure and") selected by the user, and the correction processing unit 16 displays a frame 423 to surround character strings 404 that represent a range targeted for subsequent correction. In FIG. 4B, the candidate 4132A reads "sekiwade" and means "by a product-sum", the candidate 4133A reads "sukiyade" and means "at Sukiya", the candidate 4134A reads "sukiyade" and means "I like it", the candidate 4135A reads "sekiware" and means "seat separation", and the candidate 4136A reads "hensyuusinal" and means "no editing" that is equivalent to an option of not editing the portion in the frame 412.

The correction processing unit 16 may select the character string to replace from the correction candidates based on the voice of the user, or select the character string to replace from the correction candidates based on input with the keyboard and the like. In the example of the display screen 411 in FIG. 4B, when the user speaks "いち" (reading "ichi", meaning "one") or when "1" is inputted by using a numeric keypad, the correction processing unit 16 replaces the character string in the frame 412 with the character string 4131A "セキュアで" of the correction candidate associated with the code 4131B for "1".

When the user speaks up a voice of a prescribed command (such as "次" (reading "tugi", meaning "next") or "次に進め" (reading "tuginisusume", meaning "go to next")), or when a prescribed key (such as an enter key) on the keyboard is pressed, the correction processing unit 16 may move the range targeted for correction to a subsequent range.

<<Processing to Specify Portion Having Prescribed Similarity>>

Next an example of the processing in step S7 in FIG. 3 will be described. Note that the examples described below may be carried out in combination when appropriate. In that case, the correction processing unit 16 may normalize values of similarities calculated based on respective methods, and specify the portion having the prescribed similarity based on an average value or a total value of the normalized values of the respective similarities, for example.

(Determination Based on Phonemes)

Figure 5:
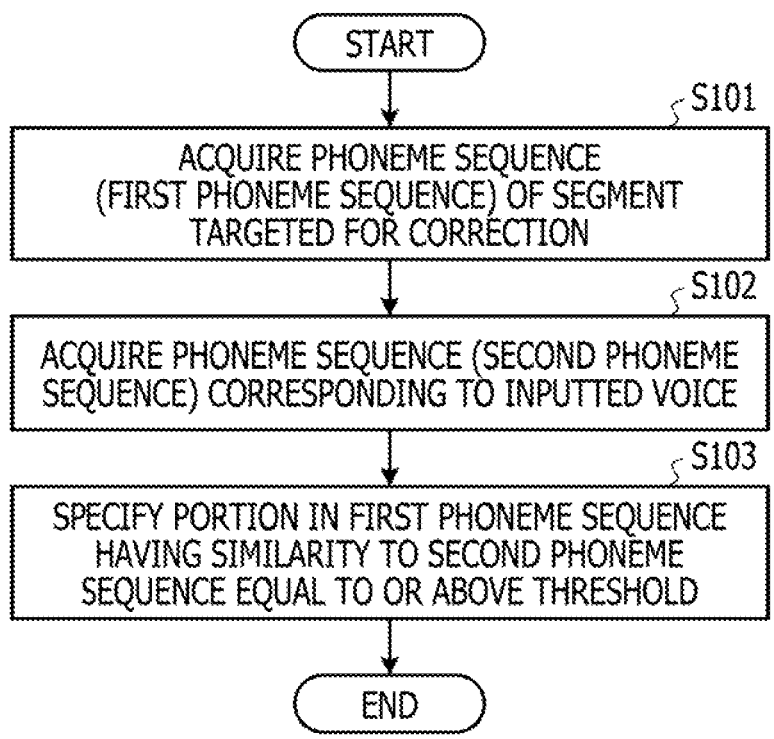
FIG. 5 is a flowchart illustrating an example of processing to specify a portion having a prescribed similarity according to the embodiment.
Figure 6:
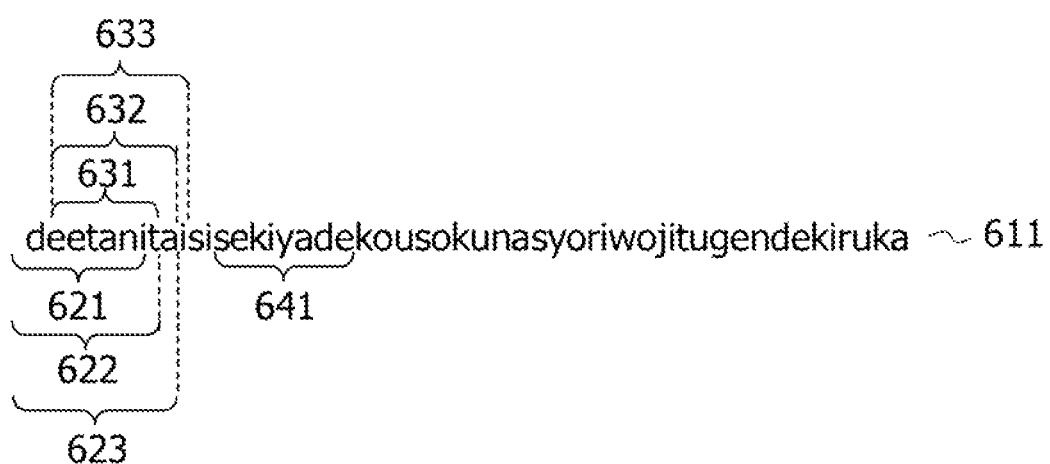
FIG. 6 is a diagram explaining the processing to specify the portion having the prescribed similarity according to the embodiment.

An example of the processing to specify the portion having the prescribed similarity based on phonemes will be described with reference to FIGS. 5 and 6. FIG. 5 is a flowchart illustrating the example of the processing to specify the portion having the prescribed similarity based on phonemes according to the embodiment. FIG. 6 is a diagram explaining the processing to specify the portion having the prescribed similarity according to the embodiment.

In step S101, the acquisition unit 13 acquires information on a phoneme sequence corresponding to the character strings in the segment targeted for correction (which represents an example of "first sound information"; hereinafter also referred to as a "first phoneme sequence" as appropriate). The acquisition unit 13 may extract the first phoneme sequence based on a waveform of a signal of the voice inputted in the processing in step S1, for example. Note that the phonemes are dusters of sounds that are deemed common to a certain language, for example. Regarding the phonemes of the Japanese language, examples of usable phonemes include: vowels /a/, /i/, /u/, /e/, and /o/; consonants /k/, /s/, /t/, /c/, /n/, /h/, /m/, y, /r/, /g/, /z/, /d/, /b/, and /p/; semivowels /j and /w/; and special moras /n/, /q/, and /h/.

When the character strings inputted in advance with the keyboard and the like are displayed instead of displaying the character strings obtained by the voice recognition in the processing from step S1 to step S3, the acquisition unit 13 may acquire the first phoneme sequence based on the former character strings. In this case, the acquisition unit 13 may acquire the first phoneme sequence by subjecting the character strings to a morphological analysis so as to extract respective words, and converting the respective extracted words into corresponding phoneme sequences with reference to dictionary data in which the words are associated with phonetic transcriptions and to data in which the transcriptions are associated with the phonemes, for example.

Next, the acquisition unit 13 acquires information on a phoneme sequence (hereinafter also referred to as a "second phoneme sequence" as appropriate) corresponding to the voice inputted in the processing in step S6 (step S102). The acquisition unit 13 may extract the second phoneme sequence based on a waveform of a signal of the voice inputted in the processing in step S6, for example. In this case, the acquisition unit 13 may infer the second phoneme sequence corresponding to the voice inputted in the processing in step S6 by using a learned model obtained by conducting machine learning based on data on combinations of waveforms of voice signals and correct phoneme sequences.

Figure 4A:
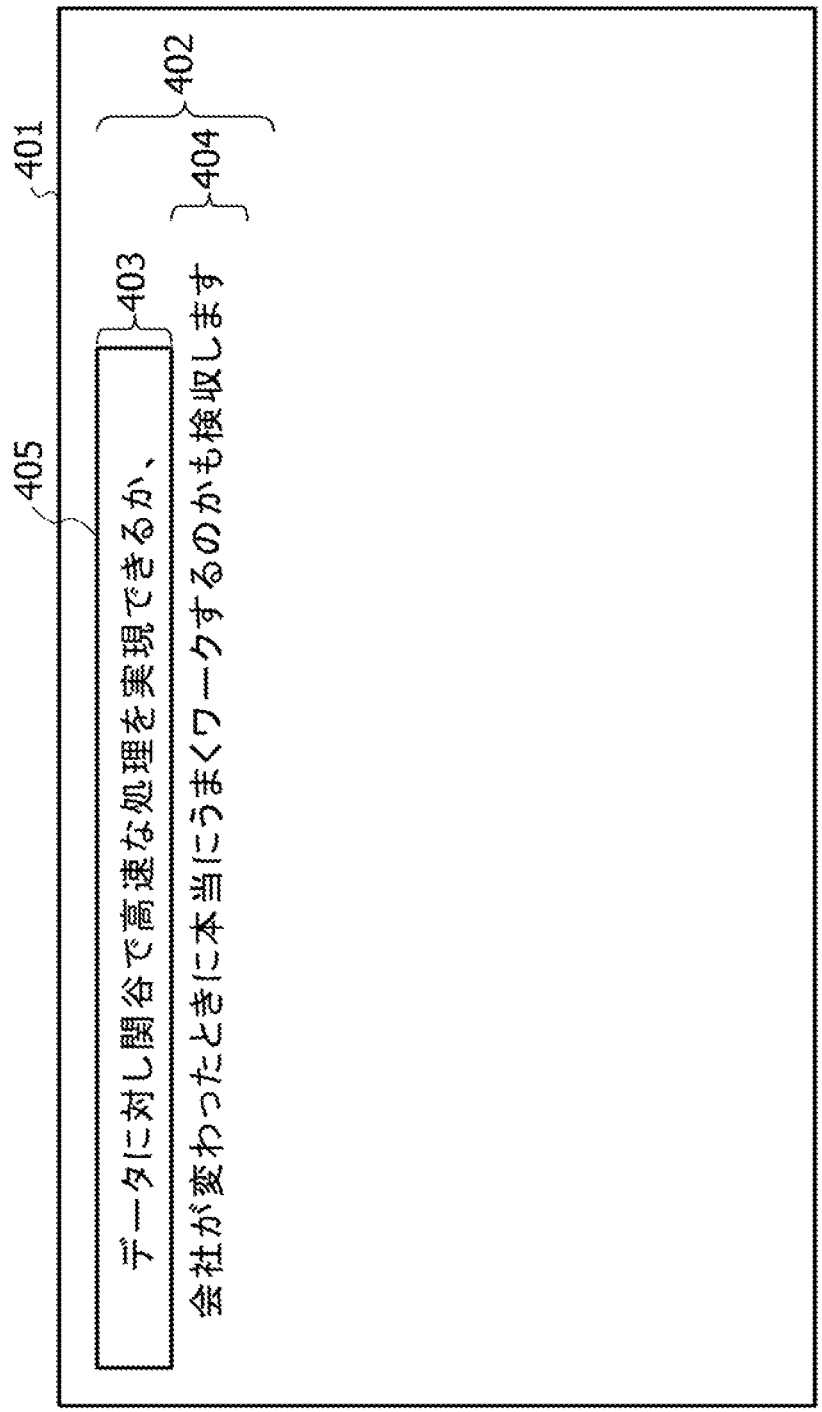
FIG. 4A is a diagram explaining an example of a display screen according to the embodiment.
Figure 4B:
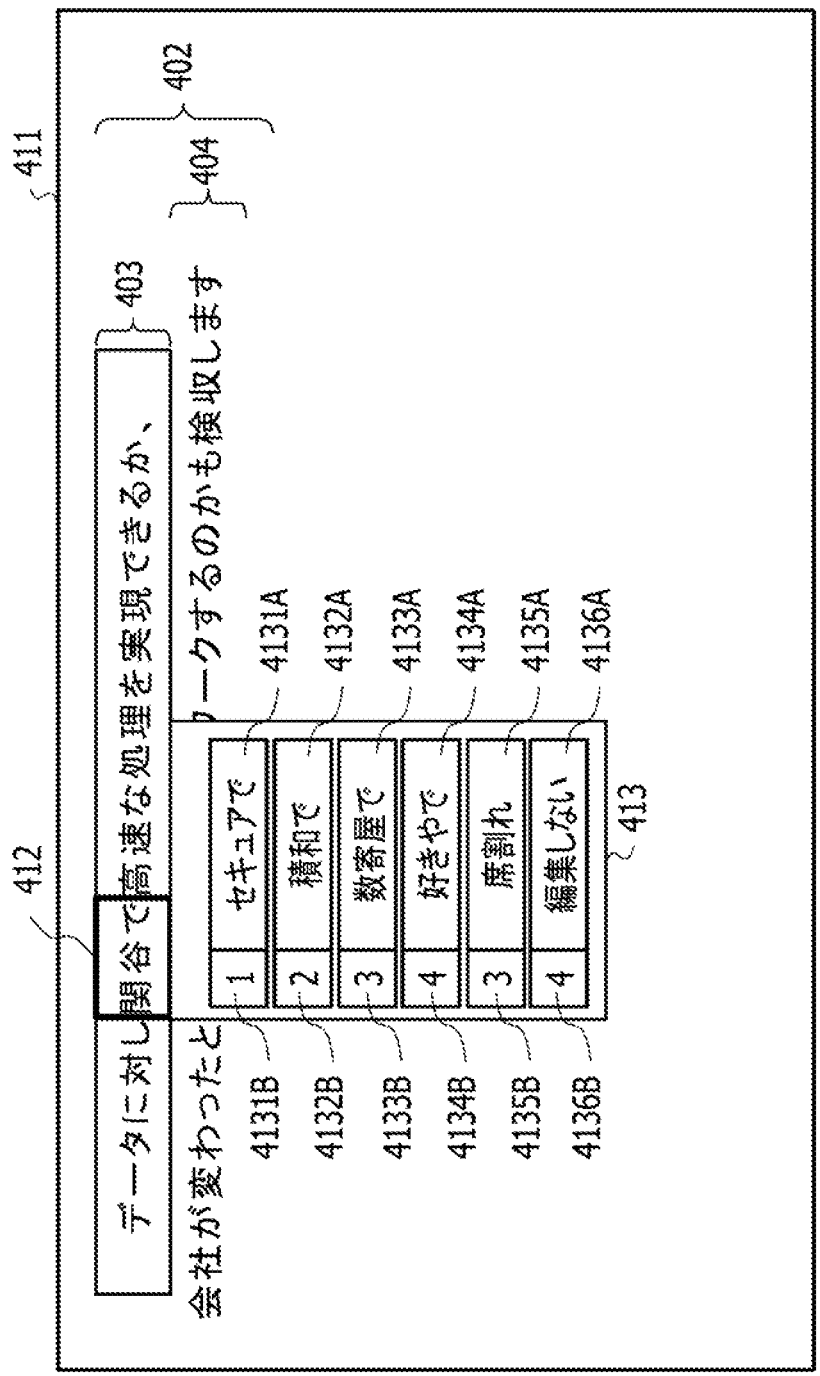
FIG. 4B is a diagram explaining another example of the display screen according to the embodiment.
Figure 4C:
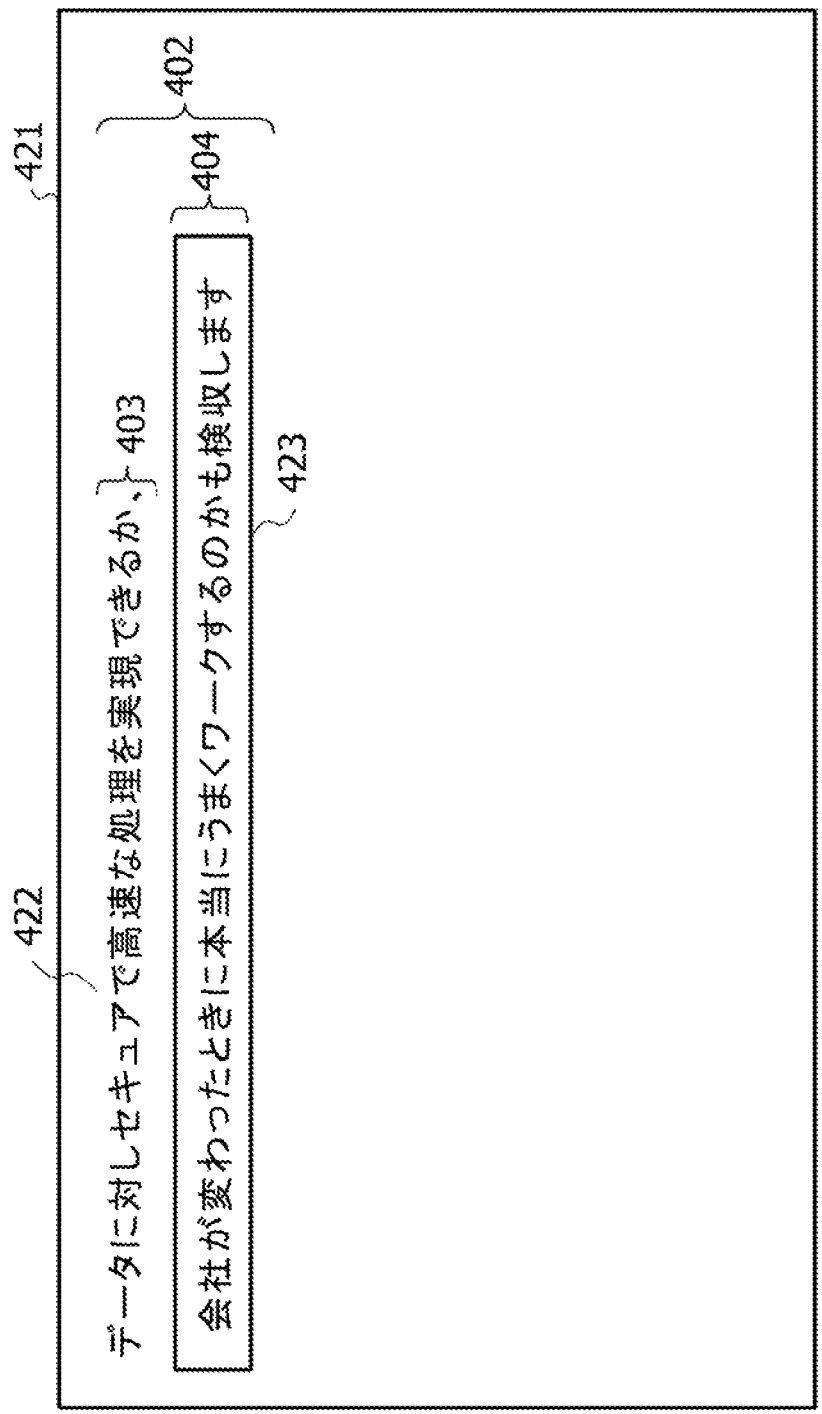
FIG. 4C is a diagram explaining another example of the display screen according to the embodiment.

In the case of FIG. 4A, the acquisition unit 13 acquires a phoneme sequence 611 reading /deetanitaisisekiyadekousokunasyoriwojitugendekiruka/ as indicated in FIG. 6 as the first phoneme sequence in answer to the character strings 403 " データに対し開合で記録" "な処理を実現できるか, in the range targeted for correction.

Next, the correction processing unit 16 specifies a portion of the phoneme sequence included in the first phoneme sequence and having a similarity to the second phoneme sequence equal to or above a threshold as the portion having the prescribed similarity (step S103). The correction processing unit 16 firstly defines respective ranges each from a head phoneme included in the first phoneme sequence to a passage of the number of phonemes included in the second phoneme sequence with an adjustment of a predetermined number (a) before and behind as appropriate as ranges of respective phoneme sequences targeted for determination. The correction processing unit 16 calculates the similarity of each of the phoneme sequences targeted for determination to the second phoneme sequence. The correction processing unit 16 may calculate the similarities between the phoneme sequences based on an edit distance (a Levenshtein distance) between the phoneme sequences, for example. In this case, the correction processing unit 16 may determine that the similarity is higher as the edit distance is smaller, for instance.

For example, the correction processing unit 16 may calculate the smallest number of times of processing involving insertion or deletion of one character requested in a case of converting one character string into another character string by repeating this processing, and define the smallest number of times as a value of the edit distance. If one character is requested to be replaced in order to covert the one character string into the other character string, then one character will be deleted and then one character will be inserted. Hence, the edit distance will be calculated as 2.

For example, the correction processing unit 16 may calculate the smallest number of times of processing involving any of insertion, deletion, or replacement of one character requested in the case of converting one character string into another character string by repeating this processing, and define the smallest number of times as the value of the edit distance.

In the following, a description will be given of an example based on the case of calculating the smallest number of times of processing involving insertion or deletion of one character requested for converting the one character string into the other character string by repeating this processing, and defining the smallest number of times as the value of the edit distance.

When the voice " セキュアで" is spoken during the processing in step S6 while displaying the display screen 401 in FIG. 4A, for example, the acquisition unit 13 acquires a phoneme sequence /sekyuade/ as the second phoneme sequence. In this case, the number of phonemes in the second phoneme sequence is 8. In the following, a description will be given of an example based on the case where the correction processing unit 16 performs the correction processing on the premise that the above-mentioned number α is 1.

The correction processing unit 16 initiates the processing to calculate the similarities from the head of the phoneme sequence to begin with. In the case of FIG. 6, a phoneme sequence 621 from the head of the phoneme sequence 611 of the first phoneme sequence to 7 (=8−1) phonemes behind, a phoneme sequence 622 from the head to 8 phonemes behind, and a phoneme sequence 623 from the head to 9 (=8+1) phonemes behind read /deetani/, /deetanit/, and /deetanita/, respectively. As a consequence, the correction processing unit 16 calculates the edit distances from the second phoneme sequence /sekyuade/ as 6, 7, and 8, respectively.

The correction processing unit 16 sequentially calculates the similarities of the respective phoneme sequences targeted for determination to the second phoneme sequence while shifting the range of the phoneme sequence targeted for determination rearward by one phoneme each time. When the ranges of the respective phoneme sequences targeted for determination are shifted rearward by just one phoneme from the head phoneme, a phoneme sequence 631 from the second phoneme of the first phoneme sequence to 7 phonemes behind, a phoneme sequence 632 from the second phoneme to 8 phonemes behind, and a phoneme sequence 633 from the second phoneme to 9 phonemes behind read /eetanit/, /eetanita/, and /eetanita/, respectively. As a consequence, the correction processing unit 16 calculates the edit distances from the second phoneme sequence /sekyuade/ as 7, 7, and 8, respectively.

The correction processing unit 16 may terminate the processing to calculate the similarities to the second phoneme sequence when the last phoneme of the first phoneme sequence is no longer included in the range of the respective phoneme sequences targeted for determination, for example. The correction processing unit 16 specifies a range having the highest similarity to the second phoneme sequence among the ranges of the respective phoneme sequences targeted for determination as the portion having the prescribed similarity, for example.

In the case of FIG. 6, the edit distance between a phoneme sequence 641 /sekiyade/ from the thirteenth phoneme of the first phoneme sequence to 8 phonemes behind and the second phoneme sequence /sekyuade/ is 2, which represents the smallest edit distance between the phoneme sequence targeted for determination and the second phoneme sequence. Accordingly, the correction processing unit 16 determines the phoneme sequence 641/sekiyade/ included in the first phoneme sequence as the portion having the similarity to the second phoneme sequence equal to or above the threshold.

(Determination Based on Waveforms of Voices)

Figure 7:
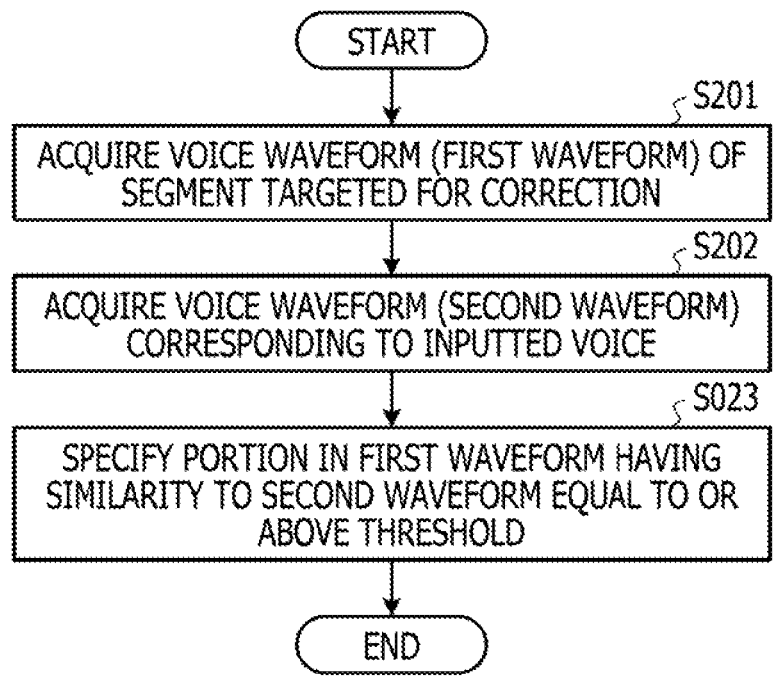
FIG. 7 is a flowchart illustrating an example of processing to specify a portion having a prescribed similarity based on waveforms of voices according to the embodiment.

Next, an example of specifying the portion having the prescribed similarity based on waveforms of voices will be described with reference to FIG. 7. FIG. 7 is a flowchart illustrating the example of the processing to specify the portion having the prescribed similarity based on waveforms of voices according to the embodiment.

In step S201, the acquisition unit 13 acquires information on a waveform of a voice corresponding to the character strings in the segment targeted for correction (which represents an example of the "first sound information"; hereinafter also referred to as a "first waveform" as appropriate). The acquisition unit 13 may define a waveform of the voice signal inputted in the processing in step S1 as the first waveform, for example.

When the character strings inputted in advance with the keyboard and the like are displayed instead of displaying the character strings obtained by the voice recognition in the processing from step S1 to step S3, the acquisition unit 13 may acquire the first waveform based on the former character strings. In this case, the acquisition unit 13 may acquire the first waveform by subjecting the character strings to a morphological analysis so as to extract respective words, and converting the respective extracted words into corresponding waveforms with reference to dictionary data in which the words are associated with phonetic transcriptions and to data in which the transcriptions are associated with the waveforms, for example.

Next, the acquisition unit 13 acquires information on a waveform (hereinafter also referred to as a "second waveform" as appropriate) corresponding to the voice inputted in the processing in step S6 (step S202).

Next, the correction processing unit 16 specifies a waveform included in the first waveform and having the similarity to the second waveform equal to or above a threshold as the portion having the prescribed similarity (step S203). The correction processing unit 16 starts the processing to calculate the similarities from the head of the phoneme sequence to begin with. For example, the correction processing unit 16 defines respective ranges each from a starting point included in the first waveform to a lapse of a time corresponding to a time length of the second waveform with an adjustment of a predetermined period (such as a time length of 10% as long as the time length of the second waveform) before and behind as appropriate as ranges of respective waveforms targeted for determination.

The correction processing unit 16 calculates the similarity of each of the waveforms targeted for determination to the second waveform. The correction processing unit 16 may calculate the similarity between the waveforms based on a cross-correlation function between the waveforms, for example. In this case, the correction processing unit 16 may determine that the similarity is higher as the value of the cross-correlation function is larger, for instance.

The correction processing unit 16 sequentially calculates the similarities of the respective waveforms targeted for determination to the second waveform while shifting the range of the waveform targeted for determination rearward by a predetermined time length (such as 0.1 second) each time.

(Determination Based on History of Falsely Recognized Phoneme Sequences)

Figure 8:
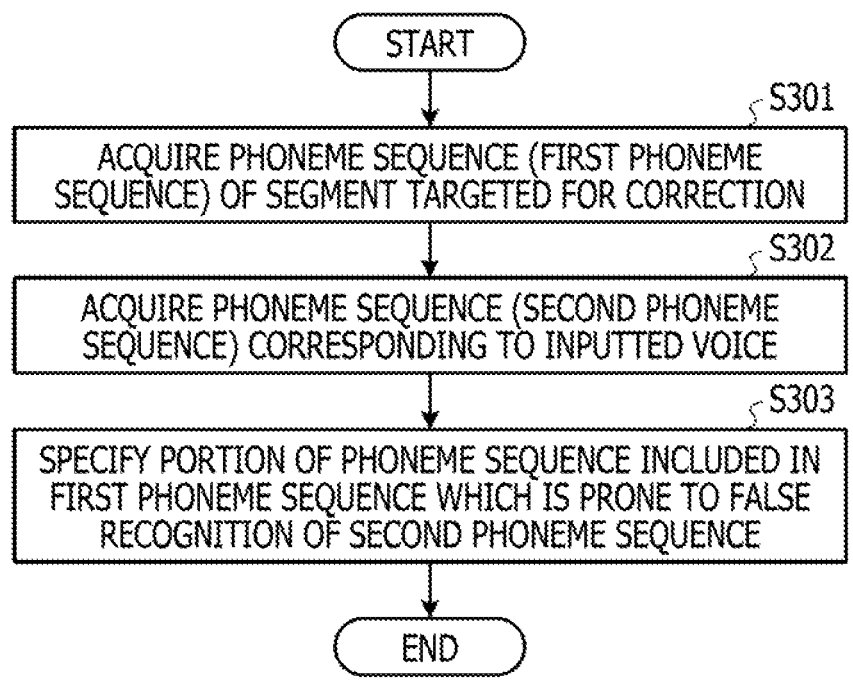
FIG. 8 is a flowchart illustrating an example of processing to specify a portion having a prescribed similarity based on a history of falsely recognized phoneme sequences according to the embodiment.

Next, an example of specifying the portion having the prescribed similarity based on a history of falsely recognized phoneme sequences will be described with reference to FIG. 8. FIG. 8 is a flowchart illustrating the example of the processing to specify the portion having the prescribed similarity based on a history of falsely recognized phoneme sequences according to the embodiment.

In step S301, the acquisition unit 13 acquires the first phoneme sequence. This processing may be the same as the processing in step S101 in FIG. 5 described above. Next, the acquisition unit 13 acquires the second phoneme sequence (step S302). This processing may be the same as the processing in step S102 in FIG. 5 described above.

Subsequently, the correction processing unit 16 refers to the history of the falsely recognized phoneme sequences stored in the falsely recognized phoneme sequence statistical DB 111 illustrated in FIG. 9 to be described later, and specifies a portion of the phoneme sequence among the phoneme sequences included in the first phoneme sequence, which is the portion prone to false recognition of the second phoneme sequence, as the portion having the prescribed similarity (step S303). For example, let us assume that the history of the falsely recognized phoneme sequences stores a phoneme sequence /kiya/ as a phoneme sequence prone to false recognition, which is associated with a correct phoneme sequence /kyua/. When the first phoneme sequence is the phoneme sequence 611 reading /deetanitaisisekiyadekousokunasyoriwojitugendekiruka/ as indicated in FIG. 6 and the second phoneme sequence is the phoneme sequence reading /sekyuade/, the correction processing unit 16 generates a phoneme sequence /seklyade/ by replacing the phoneme sequence /kyua/ included in the second phoneme sequence with a phoneme sequence /kiya/. The correction processing unit 16 specifies the portion in the first phoneme sequence which matches the generated phoneme sequence /seklyade/ as the portion having the prescribed similarity.

<<Processing to Convert Voice into Character Strings>>

Next, an example of the processing to convert the inputted voice into the character strings in step S8 in FIG. 3 will be described with reference to FIGS. 9 to 11. FIG. 9 is a diagram illustrating an example of a history of falsely recognized phoneme sequences stored in the falsely recognized phoneme sequence statistical DB 111 according to the embodiment FIG. 10 is a diagram illustrating an example of a history of falsely recognized character strings stored in the falsely recognized character string statistical DB 112 according to the embodiment. FIG. 11 is a diagram explaining an example of the display screen according to the embodiment. Note that the examples described below may be carried out in combination when appropriate.

(Conversion Based on Phonemes)

The voice recognition unit 14 may determine the character string serving as a correction candidate corresponding to the inputted voice based on the number of phonemes and on the edit distance in the phonemes. In this case, the voice recognition unit 14 calculates the numbers of phonemes in the character strings serving as the correction candidates outputted from a voice recognition engine that employs machine learning and the like, differences from the number of phonemes in the inputted voice, and the edit distances in the phonemes. The voice recognition unit 14 may determine a predetermined number (such as 1 or more) of the character strings among the outputted correction candidates in ascending order of at least one of the calculated values or a total value thereof as the correction candidates corresponding to the inputted voice.

The voice recognition unit 14 may determine the character strings serving as the correction candidates corresponding to the inputted voice based on the history of the falsely recognized phoneme sequences stored in the falsely recognized phoneme sequence statistical DB 111 illustrated in FIG. 9.

In the example in FIG. 9, the falsely recognized phoneme sequence statistical DB 111 stores fault counts associated with sets of false phoneme sequences and correct phoneme sequences. A false phoneme sequence is a phoneme sequence outputted in the past as a consequence of false recognition of a voice. A correct phoneme sequence is a correct phoneme sequence corresponding to each falsely recognized phoneme sequence. A fault count is the number of times of false recognition. The information stored in the falsely recognized phoneme sequence statistical DB 111 may be preset for each user, for example. The example in FIG. 9 records that the number of times of false recognition involving a set of a falsely recognized phoneme sequence /kyua/ and a correct phoneme sequence /kiwa/ is 220 times, and so forth. The example also records that the number of times of false recognition involving a set of a falsely recognized phoneme sequence /de/ and a correct phoneme sequence /re/ is 163 times, and so forth.

The voice recognition unit 14 extracts the sets involving the phoneme sequences included in the second phoneme sequences, each of which is recorded in the item of the false phoneme sequence in the falsely recognized phoneme sequence statistical DB 111 with the number of times of false recognition being equal to or above a predetermined threshold. In the example in FIG. 9, the phoneme sequence /kyua/ included in the second phoneme sequence and associated with the phoneme sequence /kiwa/ and the like, and the phoneme sequence /de/ included in the second phoneme sequence and associated with the phoneme sequence /re/ and the like are assumed to be registered as the sets having the number of times of false recognition equal to or above the predetermined threshold, for instance.

When the second phoneme sequence is the phoneme sequence that reads /sekyuade/, the voice recognition unit 14 generates a phoneme sequence that reads /sekiwade/ by replacing the phoneme sequence /kyua/ in the second phoneme sequence with the phoneme sequence /kiwa/, a phoneme sequence that reads /sekyuare/ by replacing the phoneme sequence /de/ in the second phoneme sequence with the phoneme sequence /re/, and a phoneme sequence that reads /sekiware/ by replacing both the phoneme sequences /kyua/ and /de/ with the phoneme sequences /kiwa/ and /re/, for example. When one of the generated phoneme sequences matches a phoneme sequence stored in a database in which a data aggregate including sets of phoneme sequences and character strings of the words is preset, the voice recognition unit 14 may determine the character string of the word corresponding to the matching phoneme sequence as the correction candidate corresponding to the inputted voice. In this case, the voice recognition unit 14 determines "███" corresponding to the above-mentioned phoneme sequence /seliware/ and the like as the correction candidates, for example.

When it is possible to divide one of the generated phoneme sequences into the phoneme sequences stored in the database, the voice recognition unit 14 may determine a character string formed by joining the character strings of the respective words corresponding to the phoneme sequences as the correction candidate corresponding to the inputted voice. In this case, the voice recognition unit 14 determines "███" corresponding to the above-mentioned phoneme sequence /sekiwade/ and the like as the correction candidates, for example.

(Conversion Based on Contents Obtained by Voice Recognition)

The voice recognition unit 14 may determine the character string serving as the correction candidate corresponding to the inputted voice based on the contents obtained by the voice recognition. In this case, the voice recognition unit 14 may determine the character string serving as the correction candidate corresponding to the inputted voice based on the history of the falsely recognized character strings stored in the falsely recognized character string statistical DB 112 illustrated in FIG. 10.

In the example in FIG. 10, the falsely recognized character string statistical DB 112 stores fault counts associated with sets of fault contents and corrected contents (correct contents). A fault content is a character string outputted in the past as a result of false recognition of a voice. A corrected content is a correct character string corresponding to each falsely recognized character string. A fault count is the number of times of false recognition. The information stored in the falsely recognized character string statistical DB 112 may be preset for each user, for example. The example in FIG. 10 records that the number of times of false recognition involving a set of a falsely recognized character string "セキュアデ" and a correct character string "███" is 220 times, and so forth.

The voice recognition unit 14 subjects the inputted voice to voice recognition, thereby converting the inputted voice into the character strings. The voice recognition unit 14 extracts the sets involving the converted character strings, each of which is recorded in the item of the fault content in the falsely recognized character string statistical DB 112 with the number of times of false recognition being equal to or above a predetermined threshold. In the example in FIG. 10, the character string "░░░░░" included in the character strings obtained by the voice recognition is assumed to be associated with the character string "░░░" and the like and registered as the set having the number of times of false recognition equal to or above the predetermined threshold. In this case, the voice recognition unit 14 may determine the character string "░░░" and the like as the correction candidates corresponding to the inputted voice.

When it is possible to divide one of the generated character strings into the character strings stored in the database, the voice recognition unit 14 may determine a character string formed by joining the character strings of the respective words corresponding to the stored character strings as the correction candidate corresponding to the inputted voice.

(Conversion Based on Specific Word)

When a specific word stored in the storage unit 11 in advance is included in a character string of a first correction candidate, the voice recognition unit 14 may display a combination of the first correction candidate and a second correction candidate obtained by replacing the specific word included in the first correction candidate with a different word and associated with the first correction word collectively as one of the correction candidates. Examples of the specific word may include a prohibited word, a self-censored word, a dialect word, and the like.

For instance, when the specific word is included in a character string of a first correction candidate on a display screen 1101 in FIG. 11, the voice recognition unit 14 changes a character string 4131A of the first correction candidate into a character string obtained by replacing the specific word with a different word which is associated with the specific word and stored in the storage unit 11 in advance. The voice recognition unit 14 may generate a character string by incorporating the specific word that is not replaced as a character string 1103 of a seventh correction candidate 1102 located beside the character string 4131A. In this case, the voice recognition unit 14 may display an alert message "░░░░" (meaning "Dialect") 1104, an icon 1105, and the like associated with the character string in order to indicate that the character string represents the specific word.

In this way, when a commentator uses a word such as a dialect word in a live broadcast program, for example, a character string obtained by replacing the dialect word or the like with a standard word or the like is displayed while associating this character string with the character string containing the dialect word or the like. This enables an operator, who is assigned to correct the character strings obtained by the voice recognition for the purpose of closed captions, to easily correct the character strings in the closed captions.

Modified Example

For example, all or part of the functional units of the information processing apparatus 10 may be realized by processing resources (cloud computing) other than the information processing apparatus 10, which include one or more computers.

Advantageous Effects of Embodiment

Techniques to display closed captions on television broadcast programs have long been diffused. Voices such as live reports and commentaries that are broadcast in a live sport program or an information program may contain a high level of noise picked up on the site and those speakers also have a variety of speech styles at the same time. Accordingly, the voice recognition of the voices broadcast in these programs may result in low accuracy in recognizing the voices. For this reason, a dedicated announcer (a closed-caption caster) picks up the voices of reports and commentaries actually broadcast in the live program and the like with a headphone, and summarizes and rephrases the contents that are picked up. There has been known a method of generating character strings for closed captions with relatively high accuracy by subjecting the rephrased voices to voice recognition. This method is referred to as a "respeaking method", for example.

In this "respeaking method", an operator engaged in correction visually checks errors (faults) of character strings for the closed captions that are generated by the voice recognition, then designates portions with errors by using a mouse, and corrects the portions with errors by keyboard input. As a consequence, it takes time and effort to perform the operation for correction.

According to the above-described embodiment, the portion having the similarity to the information concerning the sound of the accepted voice is specified out of the information concerning the sounds corresponding to the displayed sentences, and the character string corresponding to the specified portion is corrected based on the character string corresponding to the voice. This enables the user to correct the character string in the sentence easily.

Although the embodiment of the present disclosure has been described in detail above, the present disclosure is not limited to such a specific embodiment, and various modifications and changes may be made within the scope of the gist of the disclosure described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute processing comprising:

accepting input of sounds after causing a display to display a sentence including a plurality of words;

acquiring first sound information concerning sounds corresponding to the sentence;

acquiring second sound information concerning the accepted sounds;

specifying a portion in the first sound information having a prescribed similarity to the second sound information by sequentially calculating a respective similarity of a first phoneme sequence included in the first sound information to a second phoneme sequence included in the second sound information while shifting a range of the first phoneme sequence in the first sound information rearward by one phoneme each time; and correcting a character string in the sentence corresponding to the specified portion based on a character string corresponding to the second sound information.

2. The recording medium according to claim 1, wherein
the portion is specified in the specifying based on a similarity of a waveform of a voice included in the first sound information to a waveform of a voice included in the second sound information.

3. The recording medium according to claim 1, wherein
the second sound information includes a phoneme sequence obtained by changing a phoneme sequence of a voice accepted in the accepting, the changing the phoneme sequence is based on history information concerning false recognition of phoneme sequences.

4. The recording medium according to claim 1, wherein
in the correcting, the display is caused to display a character string corresponding to a phoneme sequence included in the second sound information and a character string corresponding to a phoneme sequence obtained by changing the phoneme sequence included in the second sound information, as correction candidates for a character string in the sentence corresponding to the specified portion.

5. The recording medium according to claim 4, wherein
in the correcting, the character string of the specified portion is replaced with a character string selected by a user from a plurality of character strings of the correction candidates displayed on the display.

6. The recording medium according to claim 5, wherein
when a specific word is included in a first correction candidate included in the plurality of correction candidates, a second correction candidate obtained by replacing the specific word included in the first correction candidate with a different word is displayed while associating the second correction candidate with the first correction candidate, and
when the second correction candidate is selected by the user, the specified portion is replaced with a character string of the second correction candidate.

7. The recording medium according to claim 1, wherein
the sentence is divided into a first range and a second range based on at least one of the number of words in the sentence, the number of characters in the sentence, and a breakpoint of a voice when the sentence is generated by voice recognition so as to display information indicating the first range, and
the specifying specifies a portion of the first sound information corresponding to the first range, the portion having a prescribed similarity to the second sound information.

8. The recording medium according to claim 7, wherein
the breakpoint of the voice is at least one of a mute segment and change in speaker of the voice.

9. The recording medium according to claim 1, wherein
the specifying the portion automatically specifies the portion without user input.

10. The recording medium according to claim 1, wherein
the specified portion is at least one of a plurality of targets for correction within a character string created from the accepted sound, the plurality of targets for correction being automatically specified by the specifying.

11. The recording medium according to claim 1, wherein
the specified portion is shorter in length than the acquired first sound information.

12. An information processing apparatus for transcription comprising:
a memory, and
a processor coupled to the memory and configured to perform a process including:
accepting input of sounds after causing a display to display a sentence including a plurality of words;
acquiring first sound information concerning sounds corresponding to the sentence;
acquiring second sound information concerning the accepted sounds;
specifying a portion in the first sound information having a prescribed similarity to the second sound information by sequentially calculating a respective similarity of a first phoneme sequence included in the first sound information to a second phoneme sequence included in the second sound information while shifting a range of the first phoneme sequence in the first sound information rearward by one phoneme each time; and
correcting a character string in the sentence corresponding to the specified portion based on a character string corresponding to the second sound information.

13. The information processing apparatus according to claim 12, wherein
the sentence is divided into a first range and a second range based on at least one of the number of words in the sentence, the number of characters in the sentence, and a breakpoint of a voice when the sentence is generated by voice recognition so as to display information indicating the first range, and
the specifying specifies a portion of the first sound information corresponding to the first range, the portion having a prescribed similarity to the second sound information.

14. The information processing apparatus according to claim 12, wherein the specifying the portion automatically specifies the portion without user input.

15. An information processing method for transcription performed by a computer, the method comprising:
accepting sounds after causing a display to display a sentence including a plurality of words;
acquiring first sound information concerning sounds corresponding to the sentence;
acquiring second sound information concerning the accepted sounds;
specifying a portion in the first sound information having a prescribed similarity to the second sound information by sequentially calculating a respective similarity of a first phoneme sequence included in the first sound information to a second phoneme sequence included in the second sound information while shifting a range of the first phoneme sequence in the first sound information rearward by one phoneme each time; and
correcting a character string in the sentence corresponding to the specified portion based on a character string corresponding to the second sound information.

16. The information processing method according to claim 15, wherein
the sentence is divided into a first range and a second range based on at least one of the number of words in the sentence, the number of characters in the sentence, and a breakpoint of a voice when the sentence is generated by voice recognition so as to display information indicating the first range, and the specifying specifies a portion of the first sound information corresponding to the first range, the portion having a prescribed similarity to the second sound information.

17. The information processing apparatus according to claim 15, wherein the specifying the portion automatically specifies the portion without user input.

* * * * *